D. C. FARRAN.
CHAIN APPLICATOR.
APPLICATION FILED JULY 7, 1921.
1,404,690.
Patented Jan. 24, 1922.
2 SHEETS—SHEET 1.
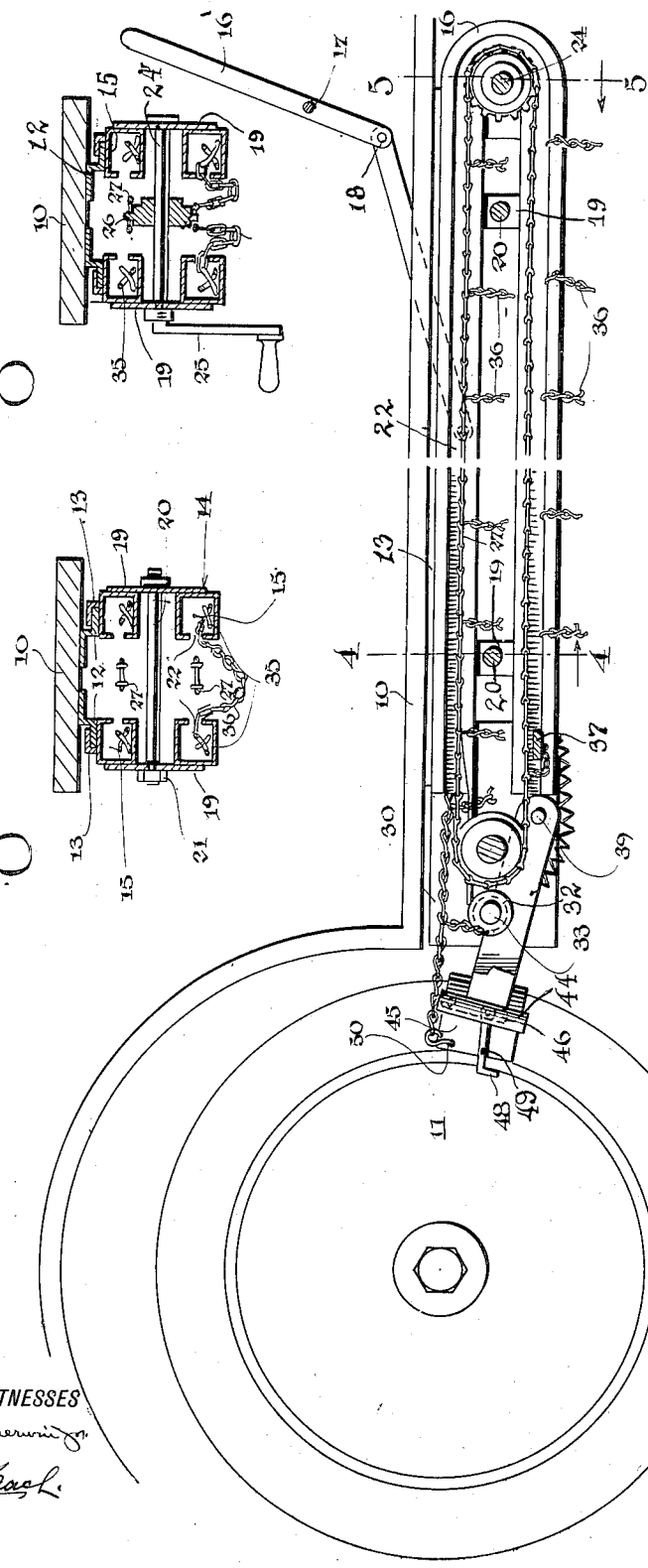
D. C. Farran.
INVENTOR
WITNESSES
BY
ATTORNEYS D. C. FARRAN.
CHAIN APPLICATOR.
APPLICATION FILED JULY 7, 1921.
1,404,690.
Patented Jan. 24, 1922.
2 SHEETS—SHEET 2.
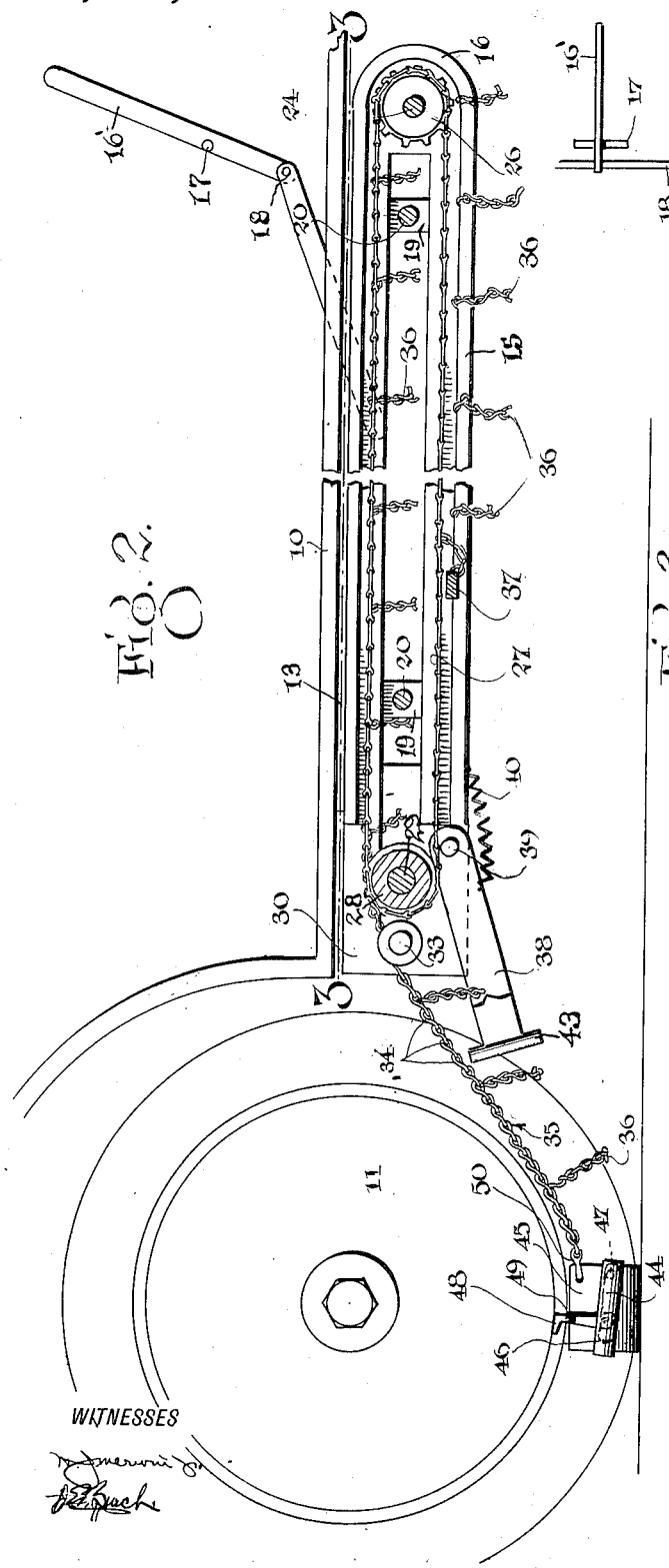
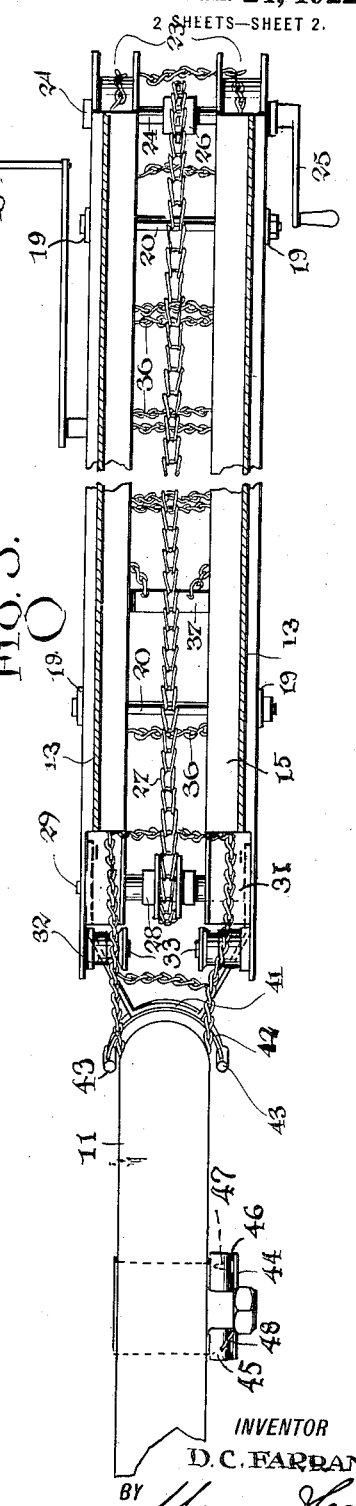
INVENTOR
D. C. FARRAN

UNITED STATES PATENT OFFICE.

DUNCAN CLIFFORD FARRAN, OF ROWAN, IOWA, ASSIGNOR OF ONE-HALF TO GUY R. SHELDON, OF ROWAN, IOWA.

CHAIN APPLICATOR.

1,404,690.  Specification of Letters Patent.  Patented Jan. 24, 1922.

Application filed July 7, 1921. Serial No. 483,073.

*To all whom it may concern:*

Be it known that I, DUNCAN CLIFFORD FARRAN, a citizen of the United States, and a resident of Rowan, in the county of Wright and State of Iowa, have invented certain new and useful Improvements in Chain Applicators, of which the following is a specification.

This invention is a chain applicator or device for attaching anti skid chains in position upon the rear wheels of an automobile without leaving the driver's seat or without stopping the car.

It is the object of the invention to provide a simple, novel, and readily operated device of the above character which will quickly apply the chain to the tire without removing the wheel or without touching the chain or applying the same by hand in the usual way and so that the anti-skid chains of both rear wheels or tires may be simultaneously applied or removed as desired.

Other and further objects of my invention will become readily apparent to persons skilled in the art, from a consideration of the following description when taken in conjunction with the accompanying drawings, wherein—

Figure 1 is a longitudinal sectional view showing the manner of applying an anti-skid chain with the improved applicator or attaching means.

Figure 2 is a similar view but showing the chain in a position when it is being applied or removed.

Figure 3 is a sectional view taken on the line 3—3 of Figure 2, showing the attachment in plan.

Figure 4 is a vertical sectional view taken on line 4—4 of Figure 1.

Figure 5 is a vertical sectional view taken on line 5—5 of Figure 1.

Figure 6 is an elevation of the chain attaching clamp looking from the opposite side with respect to that shown in Figure 3, and Figure 7 is a sectional end elevation.

Referring to the drawings in detail, there is shown the running board 10 spaced between the front and rear wheels at the opposite sides of an automobile, especially of the passenger type, the rear wheels being designated at 11 and the running board being in a position slightly above the axis of the wheel. Secured longitudinally in spaced relation beneath the running board at each side, a pair of guides 12 engaging grooved slides or guideways 13 at the top of a frame 14 extending longitudinally beneath each running board.

Each of these frames comprises a pair of opposed elongated U-shaped tubular or hollow guide ways 15 preferably of channeled cross section and bent into form from sheet metal with the bight portion 16 disposed at the front and the extremities disposed at the rear in spaced relation to the tire of the wheel. The grooved supports or guide ways 13 are mounted on the top portions of the frame 14 upon the upper leg portions of the guide ways 15, and are directed upwardly and inwardly at right angles to engage over the downwardly and outwardly offset portion of the tracks 12 so as to permit longitudinal sliding movement of the frame on said tracks beneath the running board, suitable means manually or otherwise operated being provided for shifting the same in either direction. As shown, a lever 16' is provided for this purpose and is connected below its pivot 17 with a rod 18 connecting the opposed frames or guide ways in order that the latter may be simultaneously shifted in the same direction. The opposed guide ways or U-shaped track of metal from which the same are formed, are connected by plates or washers 19 running vertically, thus bracing the guide ways in position and producing a rigid frame by reason of the connection of said plates by means of transverse connecting members or bolts 20 having reduced end portions forming shoulders to engage the inner faces of the plates thereby uniformly and positively spacing the same in parallel relation, while nuts or the like 21 engaged on the reduced threaded end of the bolts will serve to hold the parts against outward displacement, while permitting convenient assemblage or disassemblage thereof.

The guide ways 15 are provided with slots 22 and the inner faces of the guide ways are preferably lined with rubber in order to reduce the noise and also wear on the anti-skid chains which are carried therein in a manner to be hereinafter more fully explained. The slots 22 extend around the curved or bight portions 16 and said ends are preferably open as indicated at 23 in Fig. 3 of the drawing, while across said end at a point to which the curved end portions are concentric, is rotatably mounted a transverse shaft 24 adapted to be turned in any suitable way, such as by means of a detachable handle or crank handle 25. Fixed to the shaft is a sprocket wheel or pulley 26 engaged by an endless drive chain or belt 27 centrally positioned between the spaced side members or guide ways of the frame, said chain being also trained around a grooved pulley 28 carried by a shaft 29 journaled between the spaced side portions 30 of the frame beyond the open ends of the leg portions of the guide ways 15 as clearly shown in Figures 1, 2 and 3 of the drawing, in such a manner that the opposite laps or runs of the chain or belt are disposed substantially in alignment with the grooves or slots 22 of the guide ways. The bottom portions of the upper guide way or leg portions thereof, are extended rearwardly beyond the top wall thereof, as indicated at 31 so as to facilitate the entrance of the chain and to support the same in position to travel over a pair of anti-friction rollers 32 mounted on the stub shafts or pivots 33 projecting from the side portions 30 of the frame which are coextensive with the outer faces or walls of the guideplates and suitably secured thereto. These rollers are preferably provided with portions of different diameters, the outer portions being larger than the inner portions as clearly shown in the drawing and the inner end being flanged so as to prevent the displacement of the side or binding chains 34 of the anti skid chain 35, therefrom. The cross pieces 36 of the anti-skid chains are designed to extend between the slot 22 of the guide-way and between the rollers 32 while the binder chains 34 are passing over said rollers, or between the opposed horizontally aligned guide ways 15, when one end of the said skid chain is connected to the endless chain or belt 27 through the medium of suitable attaching means as indicated at 37 and the shaft 24 is rotated to cause the chain 35 to be carried around by the supporting or storing chain 27, guided by and through the slot 22 of the guide way 15 and supported by the latter beneath the running board at the opposite side of the car.

In order to facilitate the application of the chains to the tire of the wheel at each side, a U-shaped arm 38 is pivoted as shown at 39 at the extremities of its leg portions, beneath and forwardly of the roller or toothed pulley fixed to the shaft 29 and immediately to the rear of the lower guide way 15 of the frame, said arms being adapted to be held downwardly from the underside of the frame as by means of a spring 40 connecting one arm thereof to the bottom of the frame. The free end of the arm 38 is of concaved form, as indicated at 41, and holds a semicircular spring jaw 42 having spaced parallel pins 43 on the free ends thereof and adapted to be engaged by the U-shaped jaws 44 of a clamp 45, said clamp being in the form of a resilient section of metal bent in U-shaped form and adapted to conform to the cross section of the tire and rim so as to be retained thereon when the anti-skid chain is applied and be removed therefrom when the chain is removed for storage beneath the running board of the vehicle, it being understood that similar devices are provided beneath each running board at the opposite side of the automobile. The jaws 44 are mounted in spaced relation to the ends of the clamp 45 and are provided with springs 46 at the outside thereof carrying pins at their free ends as indicated at 47 adapted to snap through apertures in the sides of the jaws and to extend through the latter to the inner walls thereof at the ends or sides of the clamp 45 for engagement with the end links of a chain 35. Locking levers 48 are pivoted beneath the spring 46 adjacent to the anchored end of the latter and serve to displace the pins 47 in order that the chain may be hooked in position, and said locking levers 48 are provided with recesses 49 to engage the pins 47 beneath the springs 46 in order that the pins may be locked in retaining position, thus anchoring one end of the chain. The other end of the chain is positively anchored to the opposite side of the clamp 45, as indicated at 50.

Thus it will be seen that by mounting the clamp 45 in the arm 38 at opposite sides of the machine, and disposing the clamp in position to engage the tires of the wheels, when rotation is imparted to the drive wheel 11 by the advance of the vehicle, the chains will be wound thereon, the chain automatically unwinding from the carrying mechanism arranged beneath the running board, which mechanism is free to turn normally. When the ends of the chains have reached the clamps 45, they will automatically engage with the locking levers 48 and thereby be held beneath the pins 47, in order that the chains will be positively retained on the tires. This operation may be manually facilitated, and the same is true when the chains are removed from the tires or wheels and wound in the guide-ways by connection with the chain 27 which may be operated or driven by rotation of the shaft 24, manually or by power, as previously explained. By reason of supporting the chain in the manner explained, they may freely move into and out of the guide-way, traveling around the bight portions thereof without undue friction and thus preventing injury to the chain or catching of the parts or links thereof upon the projections which would result in the breaking thereof.

In view of the foregoing, it is thought that the operation of the device will be readily understood and in view of the simplicity and practical value that it will readily commend itself to those skilled in the art.

Having thus fully described my invention what I claim as new and desire to secure by Letters Patent is:—

1. In a device of the class described, a carriage comprising spaced side frames including upper and lower hollow guide ways, said guide ways comprising vertically disposed and spaced parallel opposed hollow U-shaped members, connecting means therefor, a shaft rotatably mounted at each end of the frame or carriage, a sprocket wheel fixed to one shaft, a pulley on the other shaft, a chain engaged on the sprocket wheel and around the pulley, said chain having means to engage one end of an anti-skid chain for drawing the same around the guide-way, means at the free end of the carriage for disposing the chain in position to engage a tire.

2. In an anti-skid chain applicator for automobiles having a running board and rear drive wheels, a frame arranged beneath each running board, said frame comprising a pair of U-shaped guide ways with their leg portions opening rearwardly and their bight portions disposed forwardly and provided with open portions, said guide ways being arranged in vertical positions and rigidly secured together in spaced parallel relation, said guide ways being of tubular cross section and closed on all sides except the inner sides, said inner sides having openings or slots extending lengthwise thereof, anti-friction means for guiding the chain into and out of said guide-ways, and movable means for supporting the chain in position to engage the tire of the wheel and comprising a member attached to said movable means and extending across and into the slots of opposed hollow members of the guide ways for movement therein.

3. The combination with an automobile, having side running boards and rear drive wheels; of a chain applicator, said applicator comprising tracks mounted longitudinally beneath said running boards, a frame slidably engaging said tracks to move toward and away from the rear wheels, means for moving said frames, said frames comprising horizontally spaced U-shaped guide ways having opposed slots said guide-ways having their bight portions disposed forwardly and the extremities of the leg portion thereof open rearwardly, an endless member disposed between said guide-ways, means for operating said endless member, means carried by said endless member for engaging a skid chain to wind the same around said guide-ways in U-shaped formation, and means for connecting the opposite end of the chain to the wheel whereby the same will be drawn from the guide-way.

4. The combination with an automobile having side running boards and rear drive wheels; of a chain applicator, said applicator comprising tracks mounted longitudinally beneath said running boards, a frame slidably engaging said tracks to move toward and away from the rear wheels, means for moving said frames, said frames comprising horizontally spaced U-shaped guide ways having opposed slots, said guide-ways having their bight portions disposed forwardly and the extremities of the leg portion thereof open rearwardly, connecting means between the leg portions of opposed guide-ways, said guide ways being of hollow tubular formation and having continuous interior slots for receiving the binder chain therethrough with the cross piece extending between opposed slots of the guide-ways, transverse connecting means between the opposed guide ways of the frame, holding the same in fixed parallel relation, an endless belt movably supported in said guide-ways with the rear turn thereof projecting rearwardly of the guide-way, means for operating said belt at the forward end thereof, a swinging U-shaped arm carried by the frame at the lower portion thereof and adapted to be thrown into and out of engagement with the vehicle tire, said arm having a U-shaped jaw, and anti-friction rollers mounted upon opposite sides of the frames at the rear ends thereof.

5. The combination with an automobile, having side running boards and rear drive wheels; of a chain applicator, said applicator comprising tracks mounted longitudinally beneath said running boards, a frame slidably engaging said tracks to move toward and away from the rear wheels, means for moving said frames, said frames comprising horizontally spaced U-shaped guide ways having opposed slots, said guide-ways having their bight portions disposed forwardly and the extremities of the leg portion thereof open rearwardly, connecting means between the leg portions of opposed guide-ways, said guide-ways being of hollow tubular formation and having continuous interior slots for receiving the binder chain therethrough with the cross piece extending between opposed slots of the guide-ways, transverse connecting means between the opposed guide ways of the frame, holding the same in fixed parallel relation, an endless belt movably supported in said guide-ways with the rear turn thereof projecting rearwardly of the guide-way, means for operating said belt at the forward end thereof, a swinging U-shaped arm carried by the frame at the lower portion thereof and adapted to be thrown into and out of engagement with the vehicle tire, said arm having a U-shaped jaw, the opposite end of the chain resting upon said arm, a clamping member connected to the binder chain and received within the jaw of said arm, and means carried by the clamp for detachably and automatically connecting the opposite ends of the chains thereto upon driving of the wheels when the clamp has been applied thereto.

DUNCAN CLIFFORD FARRAN.